United States Patent
Gu et al.

(10) Patent No.: US 8,836,894 B2
(45) Date of Patent: Sep. 16, 2014

(54) BACKLIGHT UNIT AND LIQUID CRYSTAL DISPLAY DEVICE

(75) Inventors: Yubo Gu, Guangdong (CN); Liuyang Yang, Guangdong (CN); Pei Jia, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 197 days.

(21) Appl. No.: 13/640,743

(22) PCT Filed: Aug. 29, 2012

(86) PCT No.: PCT/CN2012/080724
§ 371 (c)(1),
(2), (4) Date: Oct. 12, 2012

(87) PCT Pub. No.: WO2014/029120
PCT Pub. Date: Feb. 27, 2014

(65) Prior Publication Data
US 2014/0055703 A1    Feb. 27, 2014

(51) Int. Cl.
 G02F 1/1333    (2006.01)
 F21V 8/00      (2006.01)
 G02F 1/1335    (2006.01)

(52) U.S. Cl.
 CPC ........ *G02B 6/0035* (2013.01); *G02F 1/133615* (2013.01)
 USPC ............................... 349/65; 349/69; 362/612

(58) Field of Classification Search
 USPC ....................................... 349/65, 69; 362/612
 See application file for complete search history.

*Primary Examiner* — Phu Vu

(57) ABSTRACT

A backlight unit and a liquid crystal display device include a shell assembly having a display window, a liquid crystal panel installed in the shell assembly, and a backlight unit providing a backlight source. The backlight unit includes a light-outgoing top surface just opposite to the liquid crystal panel, a light guide plate adjacent to the incident side of the light-outgoing top surface, an optical diaphragm, a reflecting plate arranged on the bottom of the light guide plate, and a light source. The substrate or cooling plate is bent at its side close to the light-outgoing top surface to form a first bent portion; the first bent portion has a first reflecting surface for reflecting the light, making most of the light emitted by the light source enter the light guide plate, thus greatly improving the utilization ratio and transmittance of the light of the light source.

16 Claims, 3 Drawing Sheets

BACKLIGHT UNIT AND LIQUID CRYSTAL DISPLAY DEVICE

FIELD OF THE INVENTION

The present invention relates to the liquid crystal display technical field, and more particularly to a liquid crystal display device and a backlight unit used for the liquid crystal display device.

BACKGROUND OF THE INVENTION

The liquid crystal display device generates an image by making use of the optical anisotropy and polarization characteristics of the liquid crystal molecules. Because of the superiority and higher contrast in displaying the movement image, the liquid crystal display device has widely been applied to such electronic devices as televisions, displays, mobile phones, and panel computers.

Because the liquid crystal panel does not emit light, an additional light source is needed. FIG. 1 is a sectional schematic view of an existing liquid crystal display device, which includes a shell assembly, a liquid crystal panel 4, a backlight unit and so on. The shell assembly may include a front shell 1, a rear shell 2, a frame support 3 and so on that are combined to form the installation space. The liquid crystal panel 4 is installed between the front shell 1 and the frame support 3, and the front shell 1, in the shape of a frame, forms a display window 5 to allow the liquid crystal panel 4 to display outward; the backlight unit is installed between the rear shell 2 and the frame support 3 for providing a backlight light source for the liquid crystal panel 4.

As shown in the drawing, the backlight unit includes a light guide plate 6, a reflecting plate 7, a substrate 8 arranged at the side of the light guide plate 6, some light sources 9 installed on the substrate 8, and so on. At present, mostly an LED is used as the light source 9, and correspondingly the substrate 8 is an LED printed circuit board. The substrate 8 is in touch with the rear shell 2, thus transferring the heat generated by the LED to the rear shell 2 for dissipating the heat.

For better dissipating the heat generated by the light source 9, the substrate 8 is further provided at its rear side with a cooling plate. With the cooling plate in touch with the rear shell 2, the heat generated by the light source 9 is quickly transmitted to the rear shell 2 through the cooling plate to be dissipated.

Most of the existing liquid crystal display devices use the above-mentioned backlight unit, where the light source 9 emits light, which enters the light guide plate 6 and, by the guidance of the light guide plate 6, is projected onto the liquid crystal panel 4 through the light-outgoing top surface of the light guide plate 6. Besides, the light is better concentrated to the light-outgoing top surface by making use of the reflecting plate 7 below the light guide plate 6, thus the brightness being increased. However, because there is a certain distance between the light source 9 and the light guide plate 6, the light emitted from the light source 9 may escape from the top or bottom, etc., and cannot enter the light guide plate 6 completely, making the utilization ratio and transmittance of the light source 9 low.

SUMMARY OF THE INVENTION

The aim of the invention is to provide a backlight unit that can improve the light utilization ratio effectively and can be used for the liquid crystal display device.

The other aim of the invention is to provide a liquid crystal display device that can improve the light utilization ratio effectively.

The technical solution for solving the technical problem in the present invention is to construct a backlight unit used for the liquid crystal display device is provided, comprising:

a light guide plate, provided with a light-outgoing top surface and an incident side adjacent to the light-outgoing top surface;

an optical diaphragm, arranged at the outer side of the light-outgoing top surface;

a reflecting plate, arranged at a top surface of the light guide plate contrary to the light-outgoing top surface; and a light source assembly, arranged at the side of the incident side;

the light source assembly comprises: a substrate, arranged at the side of the incident side;

light sources, installed on the substrate, its light-outgoing direction being opposite to the incident side; and a cooling plate, connected closely to a side of the substrate contrary to the light source;

wherein the substrate or cooling plate is bent at its side close to the light-outgoing top surface to form a first bent portion; and the first bent portion is provided on its surface close to the light source with a first reflecting surface.

Preferably, the substrate or cooling plate forms a second bent portion at the other side opposite to the first bent portion.

Preferably, the second bent portion is provided on its surface close to the light source with a second reflecting surface.

Preferably, the first reflecting surface is a reflective surface formed directly on the surface of the first bent portion, or a reflective film adhered to the surface of the first bent portion; and the second reflecting surface is a reflective surface formed directly on the surface of the second bent portion, or a reflective film adhered to the surface of the second bent portion.

Preferably, the light source is an LED light source; and the substrate is an LED circuit substrate.

The present invention further provides a liquid crystal display device, which comprises:

a shell assembly, used for providing installation support and provided with a display window;

a liquid crystal panel, installed in the shell assembly and opposite to the display window; and a backlight unit, installed in the shell assembly and providing a backlight source for the liquid crystal panel;

the backlight unit comprises:

a light guide plate, provided with a light-outgoing top surface opposite to the liquid crystal panel and an incident side adjacent to the light-outgoing top surface;

an optical diaphragm, arranged at the outer side of the light-outgoing top surface;

a reflecting plate, arranged at the bottom of the light guide plate contrary to the light-outgoing top surface; and a light source assembly, arranged at the side of the incident side;

the light source assembly comprises: a substrate, arranged at the side of the incident side;

light sources, installed on the substrate, its light-outgoing direction being opposite to the incident side; and a cooling plate, connected closely to a side of the substrate contrary to the light source and connected with the inner wall of the shell assembly;

wherein the substrate or cooling plate is bent at its side close to the light-outgoing top surface to form a first bent portion; and the first bent portion is provided on its surface close to the light source with a first reflecting surface.

Preferably, the substrate or cooling plate forms a second bent portion at the other side opposite to the first bent portion.

Preferably, the second bent portion is provided on its surface close to the light source with a second reflecting surface.

Preferably, the first reflecting surface is a reflective surface formed directly on the surface of the first bent portion, or a reflective film adhered to the surface of the first bent portion; and the second reflecting surface is a reflective surface formed directly on the surface of the second bent portion, or a reflective film adhered to the surface of the second bent portion.

Preferably, the light source is an LED light source; and the substrate is an LED circuit substrate.

With the first bent portion arranged on the substrate or cooling plate and the first reflecting surface arranged on the first bent portion, the light emitted by the light source is reflected, making the light emitted by the light source mostly enter the light guide plate, thus greatly improving the utilization ratio and transmittance of the light of the light source.

Besides, because the first bent portion is bent and formed directly on the substrate or cooling plate without the use of an additional connection structure for the fixing installation, the present invention has the advantages of good consistency of production and assembly, simple structure, and low cost.

BRIEF DESCRIPTION OF THE DRAWINGS

The present invention is described with reference to the accompanying drawings.

DETAILED DESCRIPTION OF THE PREFERRED EMBODIMENT

Figure 1:
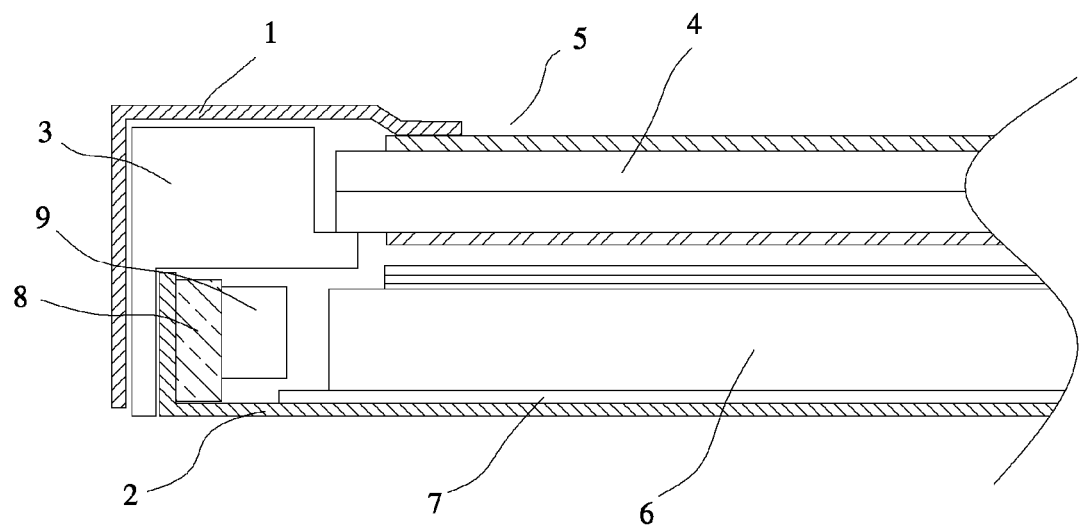
FIG. 1 is a partial sectional schematic view of the liquid crystal display device of the prior art.
Figure 2:
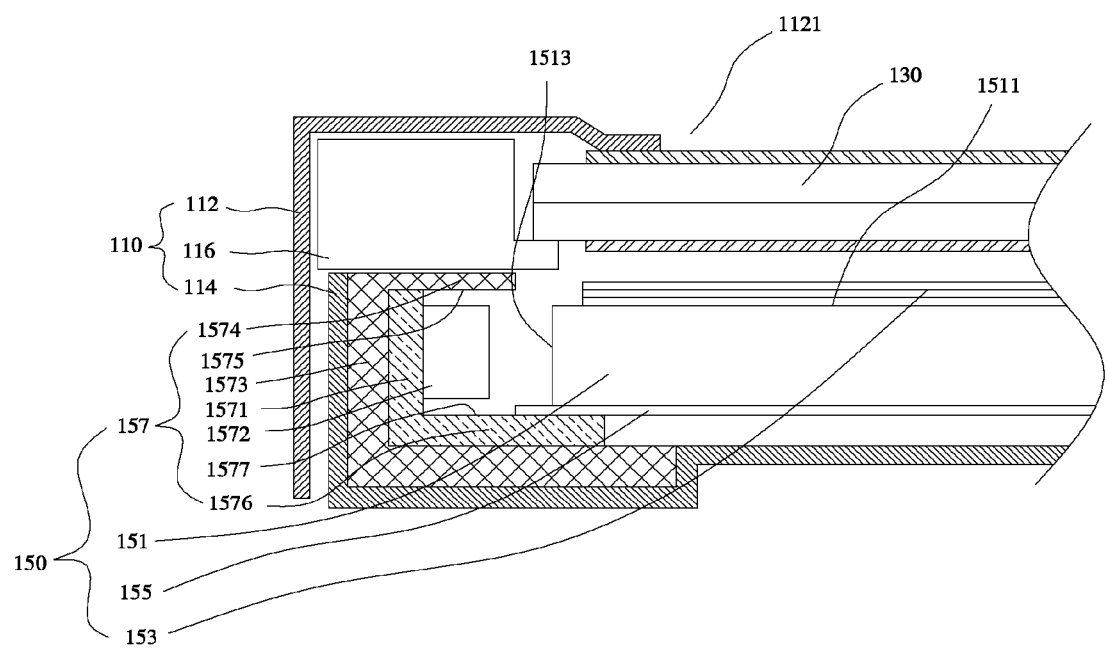
FIG. 2 is a partial sectional schematic view of the first embodiment of the liquid crystal display device according to the present invention.

FIG. 2 is a sectional schematic view of the first embodiment of the liquid crystal display device and the backlight unit 150 of the present invention. The liquid crystal display device includes a shell assembly 110, a liquid crystal panel 130, a backlight unit 150, and so on.

The shell assembly 110, including a front shell 112, a rear shell 114, a frame support 116 and so on that are combined to form the installation space, is mainly used for receiving the liquid crystal panel 130, the backlight unit 150, and so on. The front shell 112 is substantially in the shape of a frame, and forms a display window 1121 to allow the liquid crystal panel 130 to display outward. With the frame support 116 as a support of the liquid crystal panel 130, the liquid crystal panel 130 may be installed between the front shell 112 and the frame support 116, and the backlight unit 150 is installed between the rear shell 114 and the frame support 116 for providing a backlight light source 1572 for the liquid crystal panel 130.

It can be understood that the shape and combined installation of the front shell 112, the rear shell 114 and the frame support 116 can be designed as required; the liquid crystal panel 130 and the backlight assembly can also be installed as required by the various existing installation method.

As shown in the drawing, the backlight unit 150 is arranged below the liquid crystal panel 130 for providing a display light source 1572 for the liquid crystal panel 130. The backlight unit 150 includes a light guide plate 151, an optical diaphragm 153, a reflecting plate 155, a light source assembly 157, and so on.

The light guide plate 151 includes a light-outgoing top surface 1511 opposite to the liquid crystal panel 130, and an incident side 1513 adjacent to the light-outgoing top surface 1511, etc.; the transmitted light enters the light guide plate 151 through the incident side 1513, and is guided to the light-outgoing top surface 1511 to be emitted by making use of the light guide structure of the light guide plate 151, thus illuminating the liquid crystal panel 130 opposite to the light-outgoing top surface 1511.

The optical diaphragm 153, installed at the outer side of the light-outgoing top surface 1511, can be a diffusion sheet or a prism sheet, but not be limited to this, and can scatter the light emitted by the light-outgoing top surface 1511 more evenly to the liquid crystal panel 130.

The reflecting plate 155 is arranged on the bottom of the light guide plate 151 and contrary to the light-outgoing top surface 1511, and can reflect the light irradiated onto the bottom of the light guide plate 151 to the light-outgoing top surface 1511, thus improving the utilization ratio and brightness of the light.

The light source assembly 157 includes a substrate 1571, some light sources 1572, a cooling plate 1573, and so on, providing the irradiation light source 1572. The substrate 1571 is arranged at the side of the incident side 1513 of the light guide plate 151, substantially parallel to the incident side 1513; while the light source 1572 is fixedly installed on the substrate 1571, with the light-outgoing direction of the light source 1572 opposite to the incident side 1513, making the light emitted by the light source 1572 directly enter the light guide plate 151 through the incident side 1513.

In this embodiment, the LED light source 1572 can be used as the light source 1572, and correspondingly the LED circuit substrate 1571 can be used as the substrate 1571. Certainly, the light source 1572 and the substrate 1571 can also be other forms of light source 1572 and substrate 1571 without restriction. The LED circuit substrate 1571 can be a printed circuit board, an aluminum substrate 1571, a ceramic substrate 1571 or other substrate 1571 having good thermal conductivity. The light source 1572 can be installed evenly or unevenly on the substrate 1571, and the power supply is connected through the substrate 1571 for supplying power for the light source 1572.

The cooling plate 1573 is arranged at the side of the substrate 1571 contrary to the light source 1572, and closely connected with the inner wall of the substrate 1571 and the shell assembly 110; the heat generated by operation of the light source 1572 can be transferred to the cooling plate 1573 through the substrate 1571, and then transferred to the shell assembly 110 from the cooling plate 1573, thus dissipating heat quickly, extending service life of the light source 1572.

In order to make the light emitted by the light source 1572 directly enter the light guide plate 151 through the incident side 1513 as far as possible, the cooling plate 1573 is provided with a first bent portion 1574, which is provided with a first reflecting surface 1575. As shown in the drawing, the first bent portion 1574 is located at the edge of the side of the cooling plate 1573 close to the light-outgoing top surface 1511 of the light guide plate 151, and formed by bending and extending to the direction of the light guide plate 151; while the first reflecting surface 1575 is formed at the side of the first bent portion 1574 close to the light source 1572, reflecting the light emitted by the light source 1572 upward, making the light enter the light guide plate 151 through the incident side 1513, thus improving the light utilization ratio of the light source 1572.

The first reflecting surface 1575 can be a reflective surface formed directly on the surface of the first bent portion 1574, and the reflective surface can be formed by a variety of ways, such as polishing, and vapor plating and electroplating reflective material. The first bent portion 1574 is integrally molded with the substrate 1571 without additional connection structures, and the first reflecting surface 1575 is formed directly on the surface of the first bent portion 1574, making the structure greatly simplified and the consistency of production and assembly improved.

Certainly, the first reflecting surface 1575 can also be a reflective film (not shown in the drawing) adhered to the surface of the first bent portion 1574, so long as the light of the light source 1572 escaping from its upper part can be emitted to the incident side 1513 of the light guide plate 151.

Figure 3:
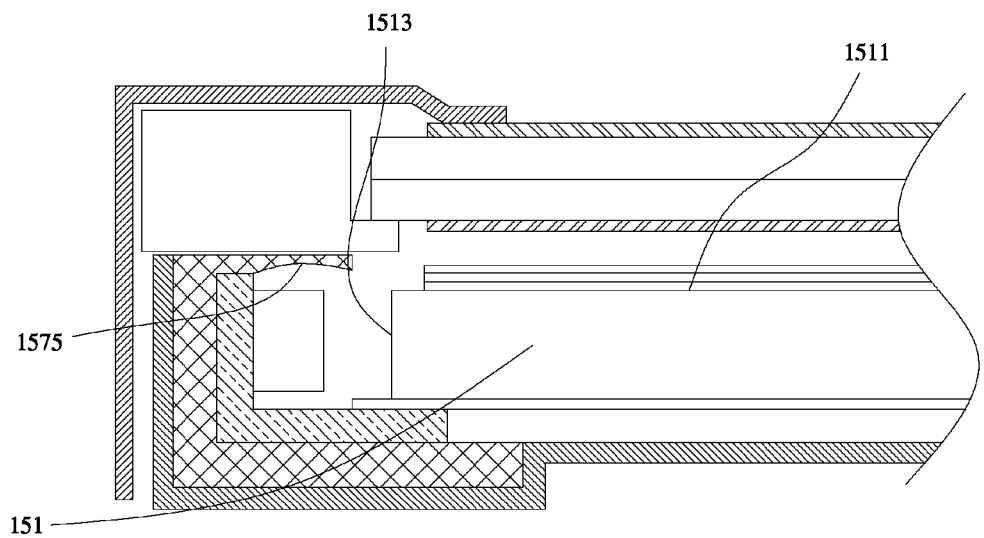
FIG. 3 is a partial sectional schematic view of the first embodiment of the liquid crystal display device according to the present invention where the first arc-shaped reflecting surface is used.

Furthermore, the first reflecting surface 1575 can be in the shape of a plane or an arc face, etc. (such as shown in FIG. 3) reflecting the light to the incident side 1513 of the light guide plate 151.

Even furthermore, the substrate 1571 is provided at the other side opposite to the first bent portion 1574 with a second bent portion 1576, which is provided on its surface close to the light source 1572 with a second reflecting surface 1577, thus further reflecting the light to the incident side 1513 of the light guide plate 151 and improving the light utilization ratio.

Certainly, the cooling plate 1573 can also be provided with a level segment in touch with the second bent portion 1576, so as to increase the contact area between the substrate 1571 and the cooling plate 1573, which is more favorable for dissipating heat.

Figure 4:
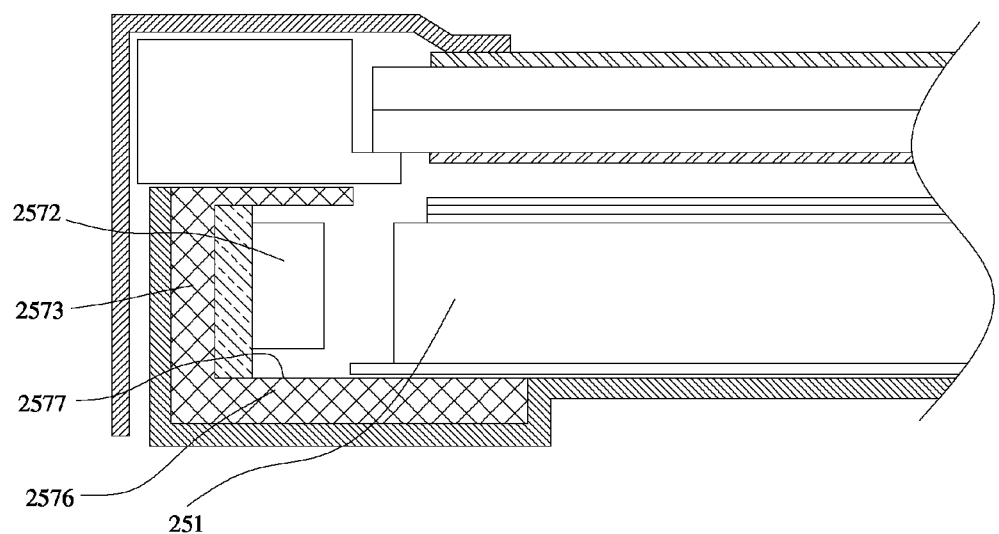
FIG. 4 is a partial sectional schematic view of the second embodiment according to the liquid crystal display device of the present invention.

FIG. 4 is a sectional schematic view of the second embodiment of the liquid crystal display device and the backlight unit of the present invention. This embodiment is different from the first embodiment in the following aspects: The second bent portion 2576 is formed by bending and extending to the direction of the light guide plate 251 at the edge of the cooling plate 2573, while the second reflecting surface 2577 is formed at the side of the second bent portion 2576 close to the light source 2572, omitting the second bent portion 1576 on the substrate 1571 of the first embodiment. While the shell assembly, the liquid crystal panel, the light guide plate, the optical diaphragm, the reflecting plate and so on have a structure substantially the same with that in the first embodiment, and therefore will not be described again.

Figure 5:
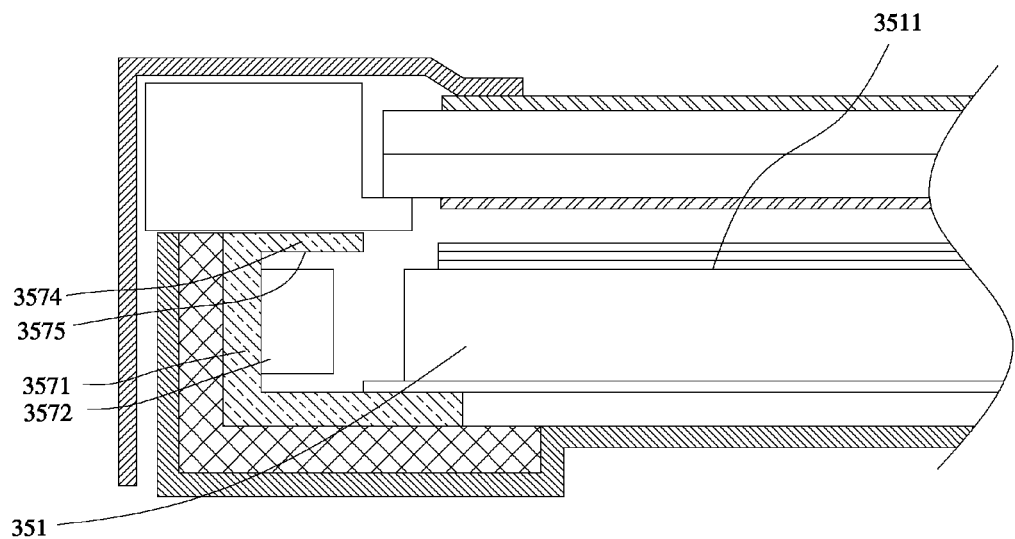
FIG. 5 is a partial sectional schematic view of the third embodiment of the liquid crystal display device according to the present invention.

FIG. 5 is a sectional schematic view of the third embodiment of the liquid crystal display device and the backlight unit of the present invention. This embodiment is different from the first embodiment in the following aspects: The first bent portion 3574 is located at the edge of the side of the substrate 3571 close to the light-outgoing top surface 3511 of the light guide plate 351, and formed by bending and extending to the direction of the light guide plate 351; while the first reflecting surface 3575 is formed at the side of the first bent portion 3574 close to the light source 3572, omitting the first bent portion 1574 on the cooling plate 1573 of the first embodiment. While the shell assembly, the liquid crystal panel, the light guide plate, the optical diaphragm, the reflecting plate and so on have a structure substantially the same with that in the first embodiment, and therefore will not be described again.

Figure 6:
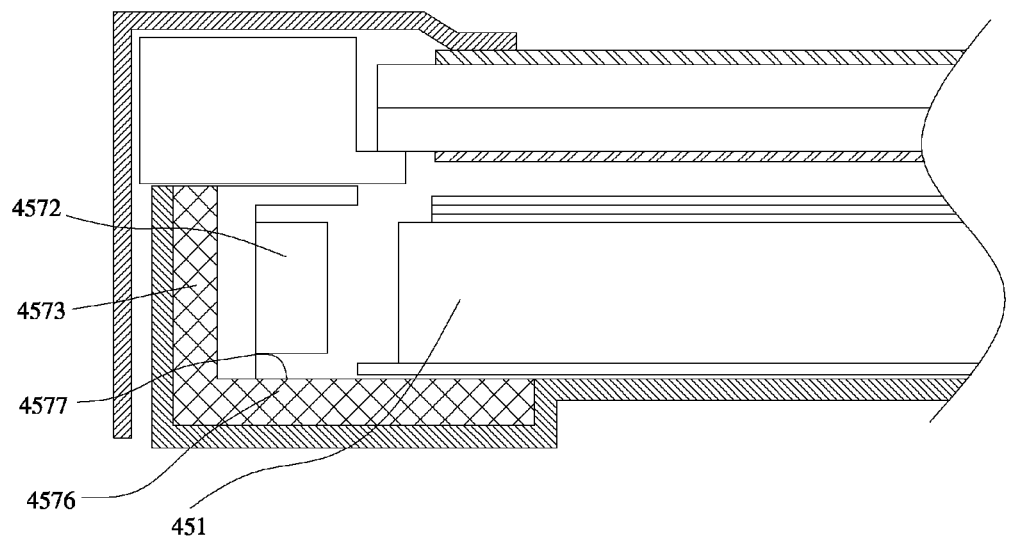
FIG. 6 is a partial sectional schematic view of the fourth embodiment of the liquid crystal display device of the present invention.

FIG. 6 is a sectional schematic view of the fourth embodiment of the liquid crystal display device and the backlight unit of the present invention. This embodiment is different from the third embodiment in the following aspects: The second bent portion 4576 is formed by bending and extending to the direction of the light guide plate 451 at the edge of the cooling plate 4573, while the second reflecting surface 4577 is formed at the side of the second bent portion 4576 close to the light source 4572, omitting the second bent portion on the substrate 3571 of the third embodiment. While the shell assembly, the liquid crystal panel, the light guide plate, the optical diaphragm, the reflecting plate and so on have a structure substantially the same with that of the first embodiment, and therefore will not be described again.

For those of ordinary skill in the art, the technical features of each of the above embodiments can be adjusted to be combined for use.

It can be understood that the above embodiments, described specifically and in detail, only express the preferred embodiments of the present invention, and cannot be understood as a limit to the range of the present invention patent. It should be indicated that, those skilled in the art, under the premise of not departing from the concept of the present invention, can make free combination and some alteration and improvement on the technical features, which all fall within the scope of protection of the present invention. Therefore, any equivalent transformation and modification of the scope of the claims of the present invention fall within the scope of the claims of the present invention.

The invention claimed is:

1. A backlight unit used for liquid crystal display devices, wherein, comprising:
    a light guide plate, provided with a light-outgoing top surface and an incident side adjacent to the light-outgoing top surface;
    an optical diaphragm, arranged at outer side of the light-outgoing top surface;
    a reflecting plate, arranged at a top surface of the light guide plate contrary to the light-outgoing top surface; and
    a light source assembly, arranged at a side of the incident side;
    the light source assembly comprises: a substrate, arranged at a side of the incident side;
    light sources, installed on the substrate, its light-outgoing direction being opposite to the incident side; and
    a cooling plate, connected closely to a side of the substrate contrary to the light source;
    wherein the substrate or cooling plate is bent at its side close to the light-outgoing top surface to form a first bent portion, which is provided on its surface close to the light source with a first reflecting surface.

2. The backlight unit of claim 1, wherein, the substrate or cooling plate forms a second bent portion at the other side opposite to the first bent portion.

3. The backlight unit of claim 2, wherein, the second bent portion is provided on its surface close to the light source with a second reflecting surface.

4. The backlight unit of claim 3, wherein, the first reflecting surface is a reflective surface formed directly on the surface of the first bent portion, or a reflective film adhered to the surface of the first bent portion; and the second reflecting surface is a reflective surface formed directly on the surface of the second bent portion, or a reflective film adhered to the surface of the second bent portion.

5. The backlight unit of claims 1, wherein, the light source is an LED light source; and the substrate is an LED circuit substrate.

6. The backlight unit of claims 2, wherein, the light source is an LED light source; and the substrate is an LED circuit substrate.

7. The backlight unit of claims 3, wherein, the light source is an LED light source; and the substrate is an LED circuit substrate.

8. The backlight unit of claims 4, wherein, the light source is an LED light source; and the substrate is an LED circuit substrate.

9. A liquid crystal display device, wherein, comprising:
   a shell assembly, used for providing installation support and provided with a display window;
   a liquid crystal panel, installed in the shell assembly and opposite to the display window; and
   a backlight unit, installed in the shell assembly and providing a backlight source for the liquid crystal panel;
   the backlight unit comprises:
   a light guide plate, provided with a light-outgoing top surface opposite to the liquid crystal panel and an incident side adjacent to the light-outgoing top surface;
   an optical diaphragm, arranged at outer side of the light-outgoing top surface;
   a reflecting plate, arranged at a bottom of the light guide plate contrary to the light-outgoing top surface; and
   a light source assembly, arranged at a side of the incident side;
   the light source assembly comprises: a substrate, arranged at a side of the incident side;
   light sources, installed on the substrate, its light-outgoing direction being opposite to the incident side; and
   a cooling plate, connected closely to a side of the substrate contrary to the light source and connected with an inner wall of the shell assembly;
   wherein the substrate or cooling plate is bent at its side close to the light-outgoing top surface to form a first bent portion; and the first bent portion is provided on its surface close to the light source with a first reflecting surface.

10. The liquid crystal display device of claim 9, wherein, the substrate or cooling plate forms a second bent portion at the other side opposite to the first bent portion.

11. The liquid crystal display device of claim 10, wherein, the second bent portion is provided on its surface close to the light source with a second reflecting surface.

12. The liquid crystal display device of claim 11, wherein, the first reflecting surface is a reflective surface formed directly on the surface of the first bent portion, or a reflective film adhered to the surface of the first bent portion; and
   the second reflecting surface is a reflective surface formed directly on the surface of the second bent portion, or a reflective film adhered to the surface of the second bent portion.

13. The liquid crystal display device of claims 9, wherein, the light source is an LED light source; and the substrate is an LED circuit substrate.

14. The liquid crystal display device of claims 10, wherein, the light source is an LED light source; and the substrate is an LED circuit substrate.

15. The liquid crystal display device of claims 11, wherein, the light source is an LED light source; and the substrate is an LED circuit substrate.

16. The liquid crystal display device of claims 12, wherein, the light source is an LED light source; and the substrate is an LED circuit substrate.

* * * * *